US012461234B2

(12) United States Patent
Sekiguchi et al.

(10) Patent No.: US 12,461,234 B2
(45) Date of Patent: Nov. 4, 2025

(54) VEHICLE OBJECT DETECTION SYSTEM AND METHOD FOR DETECTING A TARGET OBJECT IN A DETECTION AREA LOCATED BEHIND AND LATERAL OF A SUBJECT VEHICLE

(71) Applicants: AUMOVIO Autonomous Mobility Germany GmbH, Ingolstadt (DE); TOYOTA JIDOSHA KABUSHIKI KAISHA, Toyota (JP)

(72) Inventors: Shoichi Sekiguchi, Singapore (SG); Yusuke Ishimatsu, Toyota (JP); Takashi Unigame, Toyota (JP); Issei Matsunaga, Toyota (JP)

(73) Assignees: AUMOVIO AUTONOMOUS MOBILITY GERMANY GMBH, Ingolstadt (DE); TOYOTA JIDOSHA KABUSHIKI KAISHA, Toyota (JP)

( * ) Notice: Subject to any disclaimer, the term of this patent is extended or adjusted under 35 U.S.C. 154(b) by 7 days.

(21) Appl. No.: 18/482,319

(22) Filed: Oct. 6, 2023

(65) Prior Publication Data

US 2024/0134039 A1 Apr. 25, 2024
US 2024/0230889 A9 Jul. 11, 2024

(30) Foreign Application Priority Data

Oct. 19, 2022 (EP) .................................... 22202610

(51) Int. Cl.
*G01S 13/931* (2020.01)
*B60Q 9/00* (2006.01)
(52) U.S. Cl.
CPC ............ *G01S 13/931* (2013.01); *B60Q 9/008* (2013.01)

(58) Field of Classification Search
CPC .......... G08G 1/167; G01S 2013/93272; G01S 13/931; B60Q 9/008
See application file for complete search history.

(56) References Cited

U.S. PATENT DOCUMENTS

2014/0015972 A1* 1/2014 Hoek ...................... B60R 1/007
348/148
2014/0225722 A1 8/2014 Takahashi et al.
(Continued)

FOREIGN PATENT DOCUMENTS

| JP | 2017-13756 A | 1/2017 |
| JP | 2018-73365 A | 5/2018 |
| JP | 2019-3235 A | 1/2019 |

OTHER PUBLICATIONS

Communication issued Nov. 5, 2024 in Japanese Application No. 2023-175396.

*Primary Examiner* — Sisay Yacob
(74) *Attorney, Agent, or Firm* — Sughrue Mion, PLLC (57) ABSTRACT

A vehicle object detection system for detecting a target object in a detection area located behind and/or lateral of a subject vehicle, that is configured to generate a judgement on whether a target object which has been detected in the detection area is an alert object, to output the judgement to warning means which is configured to output a warning to a driver of the subject vehicle based on the judgement indicating that the target object is an alert object, and to generate the judgement based on: one or more positions of one or more other objects other than the target object being detected to be located between the target object and the subject vehicle, and a time period during which the target object is detected, being smaller than a specified period of time.

17 Claims, 3 Drawing Sheets

(56) References Cited

U.S. PATENT DOCUMENTS

| | | | |
|---|---|---|---|
| 2014/0354450 A1 | 12/2014 | Takahashi et al. | |
| 2017/0008517 A1* | 1/2017 | Himi | G01S 15/87 |
| 2017/0285164 A1 | 10/2017 | Kato | |
| 2021/0354717 A1 | 11/2021 | Sakamoto | |
| 2022/0048500 A1* | 2/2022 | Nguyen Van | B60W 10/20 |

* cited by examiner

VEHICLE OBJECT DETECTION SYSTEM AND METHOD FOR DETECTING A TARGET OBJECT IN A DETECTION AREA LOCATED BEHIND AND LATERAL OF A SUBJECT VEHICLE

TECHNICAL FIELD

The invention relates to a vehicle object detection system, preferably a rear-cross traffic detection system, for detecting a target object like a vehicle in a detection area located behind and/or lateral of a subject vehicle.

Furthermore, the invention relates to a computer-implemented method for detecting a target object like a vehicle in a detection area located behind/or lateral of a subject vehicle, particularly for controlling such a vehicle object detection system.

Moreover, the invention relates to a driver assistance system for a vehicle, comprising such a vehicle object detection system, a corresponding computer program for carrying out the computer-implemented method and a respective non-transitory computer-readable medium.

BACKGROUND

Conventional Driver Assistance Systems or Advanced Driver Assistance Systems (ADAS) for vehicles are widely used, for example, in connection with conventional vehicles as well as autonomous vehicles, and usually comprise such vehicle object detection systems.

Many vehicle accidents are caused by human error, which might have been avoided by means of such Advanced Driver Assistance Systems. Commonly known safety-critical ADAS applications include pedestrian detection/avoidance, lane departure warning/correction, traffic sign recognition, automatic emergency braking, (rear-)-cross-traffic alert and blind spot detection (BSD), for example.

In connection with (rear-)-cross-traffic alert, the respective rear cross traffic alert (RCTA) system often uses the same detecting means like a radar infrastructure as the one used for detecting vehicles in the blind spot (BSD).

For example, long range radars/long range radar sensors are usually used for applications like emergency brake assist and adaptive cruise control, while short-range-radars are often employed in connection with applications like blind spot detection (BSD), rear-cross-traffic-alert, lane-change-assist and rear pre-crash systems, for example.

In connection with (rear-)-cross-traffic alert, the conventional rear cross traffic alert (RCTA) systems use a radar infrastructure like radar sensors for detecting vehicles or objects in the blind spot (Blind Spot Detection, BSD) and can help to avoid accidents when reversing out of a parking space, i.e. when the subject vehicle moves backward.

In case of a possible collision or a dangerous situation, a rear traffic approaching notification (RTAN) may be output by the ROTA system to a driver of the subject vehicle by means of a visual or acoustic indicator, which notification is usually output by a Rear Approaching Target Notification System (RTAN system) implemented by the vehicle object detection system.

However, there is the problem that such systems provide a function that determines the possibility of a collision or a dangerous situation between the subject vehicle moving backward and a detected supposed target object located behind and/or lateral of the subject vehicle, i.e. approaching from a side of and behind the subject vehicle, when the subject vehicle moves backward based on a so-called Time To Collision (TTC) and a crossing prediction for the collision danger area, and provides a warning, even if there is actually no target object, i.e. the target object detected in the detection area is actually not existent. That is, a warning is activated and output for warning a driver of the subject vehicle against an approaching moving object/target object which is actually not existent.

SUMMARY OF THE INVENTION

A vehicle object detection system according to the invention is preferably a rear-cross traffic detection system and is for detecting a target object in a detection area located behind and/or lateral of a subject vehicle, wherein the vehicle object detection system comprises judging means configured to generate a judgement on whether a target object which has been detected in the detection area is an alert object, and to output the judgement to warning means which is configured to output a warning to a driver of the subject vehicle based on the judgement indicating that the target object is an alert object. Moreover, the judging means is configured to generate the judgement based on one or more positions of one or more other objects other than the target object being detected to be located between the target object and the subject vehicle, and a time period during which the target object is detected, being smaller than a specified period of time.

Accordingly, said time period being a period of time beginning at the point in time the target object was first detected and during which period of time the target object is being detected, being smaller than a specified period of time. For example, said time period or period of time being a time period during which the target object is continuously detected, or detected at least a predefined number of times per scanning cycle performed by sensors, like radar sensors.

By means of the vehicle object detection system according to the invention, it can be achieved that no alarm/warning is output if a target object detected in the detection area is in fact a false detection caused by reflections on other objects.

Most preferable, in order to recognize/judge a target object to be not an alert object like a mirror object, all of the following conditions should be met/satisfied:

there are multiple stationary objects between the subject vehicle and the detected target object, a period of time, beginning at a point in time when the target object was first detected in the detection area or in the specified area, and during which the target object is being detected, is less then specified period of time (for example, such a specified period of time may be 7 s), a reflection strength of the target object, detected as moving object, for example, is less than a specified value, and the position of the target object is detected to be located in a specified area which is part of and included in the detection area.

Accordingly, if all these conditions are satisfied/met, a false warning resulting from stray reflections may be avoided.

In essence, the present invention provides a method or an algorithm for reducing false alarms, i.e. unnecessary warning, in a rear cross-traffic alert system against target objects which are mirror-like objects caused by reflections of other objects, for example, and which are actually not existent. Accordingly, in other words, in the context of this disclosure, the term "mirror object" or "mirror-like object" is understood to mean an object that, even if a result of a detection by a sensor indicates an object to be present, does actually not exist but detection is rather caused by a reflection, for example, a radar reflection on another object which may be actually present in a detection area.

By means of the present invention, such mirror-like objects can be identified while the subject vehicle is travelling rearward/backward, if the aforementioned conditions are judged to be satisfied. In this case, according to the present invention, an instruction to suppress the warning function for outputting a warning to the driver of the vehicle is sent to warning means. As a result, the logic for outputting a warning in other cases than the above described one may continue to operate, while the logic according to the invention may suppress a false alert/unnecessary warning under specific circumstances, i.e. if the aforementioned conditions are satisfied.

Accordingly, one of the advantageous effects achieved by the invention is to avoid unnecessary alarm warnings/activations.

The vehicle object detection system according to the invention can be further modified in such a way that wherein the judging means is configured to generate the judgement further based on a detected reflection strength of the detected target object, the reflection strength being indicative of an amount of energy that the detected target object reflects off and being less than a specified value. The reflection strength indicates how detectable an object is by its reflection amount of energy and is a property of the reflectivity of the respective object. For example, the reflection strength may be an amplitude, or power, of the reflected signal. The reflected signal may be a reflection of a signal emitted by a sensor on the vehicle. The signal and the reflected signal may for example, be electromagnetic signals. The sensor may be for example, a radar or a LiDAR sensor.

Preferably, the specified value is a value higher than a sensor sensitivity value above which an object is detected and considered/judged to be a target object, and below which no object is detected at all or at least considered/judged as some kind of noise not constituting a real object actually present.

In other words, if a detected reflectance is below the sensor sensitivity value, the output of the sensor, i.e. the result of the detection, is considered as no object being detected or rather noise being detected. If a detected reflectance is higher than the sensor sensitivity value but below the specified value, the output of the sensor is considered that an object is detected which may be a target object for the time being. In this case, the above-mentioned further condition/s is/are evaluated and it is then decided whether the detected target object is an alert object or not an alert object, i.e. a mirror object or mirror-like object, which should not trigger a warning. If the detected reflectance is higher than the specified value, the output of the sensor is considered that, in any case, an object is detected which is a target object. Such an object will not be considered as a mirror object or a mirror-like object but as an object which is actually existent/present in the detection area.

In particular, the reflection strength may be a radar cross-section (RCS) or a radar signature. In more concrete terms, radar cross-section (RCS) or radar signature is a measure of how detectable an object is by radar. A larger RCS indicates that an object is more easily detected. An object reflects a limited amount of radar energy back to the source. The factors that influence this include the material with which the target is made, the size of the target relative to the wavelength of the illuminating radar signal, the absolute size of the target, the incident angle (angle at which the radar beam hits a particular portion of the target, which depends upon the shape of the target and its orientation to the radar source), the reflected angle (angle at which the reflected beam leaves the part of the target hit; it depends upon incident angle), the polarization of the transmitted and the received radiation with respect to the orientation of the target. The RCS is a property of the target's reflectivity.

Moreover, the vehicle object detection system according to the invention can be further configured in such a way that the judging means is configured to generate the judgement further based on a detected position of the target object with respect to the subject vehicle being within a specified area with respect to the subject vehicle, being an area behind and/or lateral of the subject vehicle and being included in the detection area.

In this connection, the vehicle object detection system according to the invention can be further implemented in such a way that the specified area being defined as an area beginning at a radial distance from the subject vehicle, preferably at 9 m from the subject vehicle, and ending at a radial distance from the subject vehicle, preferably at 42 m, and/or being defined as an area which is larger than a specified lateral distance to the subject vehicle, preferably larger than 5 m in lateral direction from the subject vehicle.

Additionally, the vehicle object detection system according to the invention can be further modified in such a way that wherein the one or more positions of the one or more other objects are detected to be in an area of the detection area being located between the subject vehicle and the specified area.

Moreover, the vehicle object detection system according to the invention can be further realized in such a way that the one or more other objects are detected to be one or more stationary objects and/or are detected to be located in a specific angle region, an angle of the specific angle region being defined by a position of a sensor of the subject vehicle as vertex, with the target object being located on the angle bisector. For example, the angle may be in a range of plus/minus 5 degrees with respect to the angle bisector.

Also, the vehicle object detection system according to the invention can be further configured in such a way that the judging means is configured to generate the judgement on whether the target object which has been detected in the detection area is an alert object, in response to the subject vehicle being detected to move backward.

Additionally, the vehicle object detection system according to the invention can be further implemented in such a way that the judging means is configured to, based on the subject vehicle moving backward, generate the judgement indicating that the target object is not an alert object based on at least the following conditions being satisfied, the (secondary) conditions being
 (i) one or more positions of one or more other objects other than the target object being detected to be located between the target object and the subject vehicle,
 (ii) a time period during which the target object is detected, being smaller than a specified period of time,
 (iii) a detected reflection strength of the detected target object being less than a specified value, the reflection strength being indicative of an amount of energy that the detected target object reflects off, and
 (iv) a detected position of the target object with respect to the subject vehicle being within a specified area with respect to the subject vehicle, being an area behind and/or lateral of the subject vehicle and being included in the detection area.

Moreover, the vehicle object detection system according to the invention can be further realized in such a way that the judging means is configured to, based on the subject vehicle moving backward, judge whether a candidate object detected in the detection area is a candidate for being considered as target object used for the judgment of whether the target object is an alert object by evaluating the following primary conditions:

the object detected in the detection area is approaching the subject vehicle, while the subject vehicle is moving backward, and/or an estimated time of collision between the subject vehicle and the object detected in the detection area is less than a specified time. Accordingly, in essence, it is first judged whether the primary conditions are satisfied. If so, a warning will be output unless the above-mentioned first to fourth (secondary) conditions are satisfied, causing that the output of a warning will be suppressed.

Moreover, the vehicle object detection system according to the invention can be further configured in such a way that the judging means is configured to output the judgement to the warning means which judgement indicates to the warning means not to output a warning even if a target object has been detected, based on the judging means generating the judgement indicating that the target object is not an alert object.

A driver assistance system according to the invention is for a subject vehicle, and comprises detecting means configured to detect a target object in a detection area located behind and/or lateral of the subject vehicle, a vehicle object detection system according to the invention as outlined above, and warning means configured to warn a driver of the subject vehicle that a target object is present in the detection area based on the judging means of the vehicle object detection system generating the judgement indicating that the target object is an alert object.

The driver assistance system according to the invention can be further modified in such a way that the detecting means comprises at least two sensors, preferably at least two radar sensors, like two short range radar sensors, for detecting a target object in the detection area.

A vehicle according to the invention is preferably an autonomous vehicle and comprises a driver assistance system according to the invention as described above, wherein the one sensor is located at a left rear edge/region of the vehicle and the other sensor is located at a right rear edge/region of the vehicle.

A computer-implemented method according to the invention is for detecting a target object in a detection area located behind and/or lateral of a subject vehicle, particularly for controlling a vehicle object detection system according to the invention as described above, wherein the method comprises the following steps:

generating a judgement on whether a target object which has been detected in the detection area is an alert object, and outputting the judgement to warning means which is configured to output a warning to a driver of the subject vehicle based on the judgement indicating that the target object is an alert object, wherein, in the step of judging, generating the judgement is based on at least one or more positions of one or more other objects other than the target object being detected to be located between the target object and the subject vehicle, and a time period during which the target object is detected, being smaller than a specified period of time.

Accordingly, the properties and advantages explained in connection with the vehicle object detection system according to the invention arise in the same or similar manner in respect of the computer-implemented method for detecting a target object in a detection area located behind a subject vehicle according to the present invention, which is why, in order to avoid repetitions, reference is made to the respective explanations with respect to the vehicle object detection system according to the invention.

A computer program according to the invention comprises instructions which, when the program is executed by a computer or a processor, cause the computer or processor to carry out the above-mentioned computer-implemented method according to the invention.

A non-transitory computer-readable medium according to the invention has stored thereon the above-mentioned computer program according to the invention.

BRIEF DESCRIPTION OF THE DRAWINGS

Preferred embodiments and advantages of the invention will become more apparent upon reading the following detailed description along with the accompanying drawings in which.

DETAILED DESCRIPTION

In this context, the vehicle object detection system as described in this description may include a memory which is for example used in the processing carried out in the vehicle object detection system. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In this context, the vehicle object detection system as described in this description may include a processor or a "circuit". A "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

With reference to the drawings, preferred first and second embodiments of the present invention will now be specifically described for illustrative purposes. It is to be understood that components or elements in these embodiments will be shown and described by way of examples only, but are not intended to limit this invention to them.

First Embodiment

Figure 1:
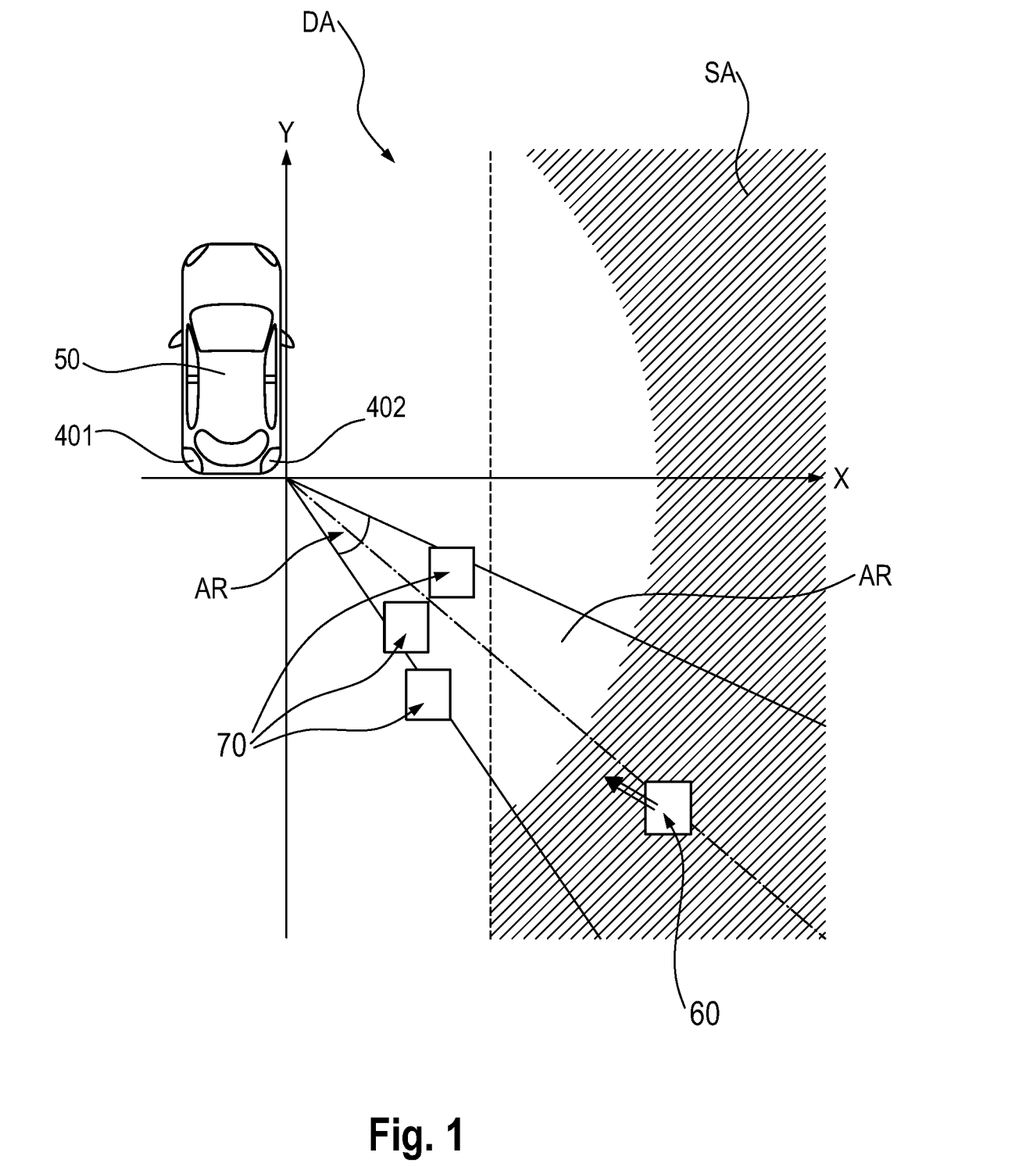
FIG. 1 shows a first embodiment of a vehicle according to the invention provided with a driver assistance system according to the invention in a concrete backward driving situation.

FIG. 1 shows a first embodiment of a vehicle 50 according to the invention provided with a driver assistance system 1 according to the invention in a concrete backward driving situation, which driver assistance system 1 will be described in more concrete terms in connection with FIG. 3.

Figure 3:
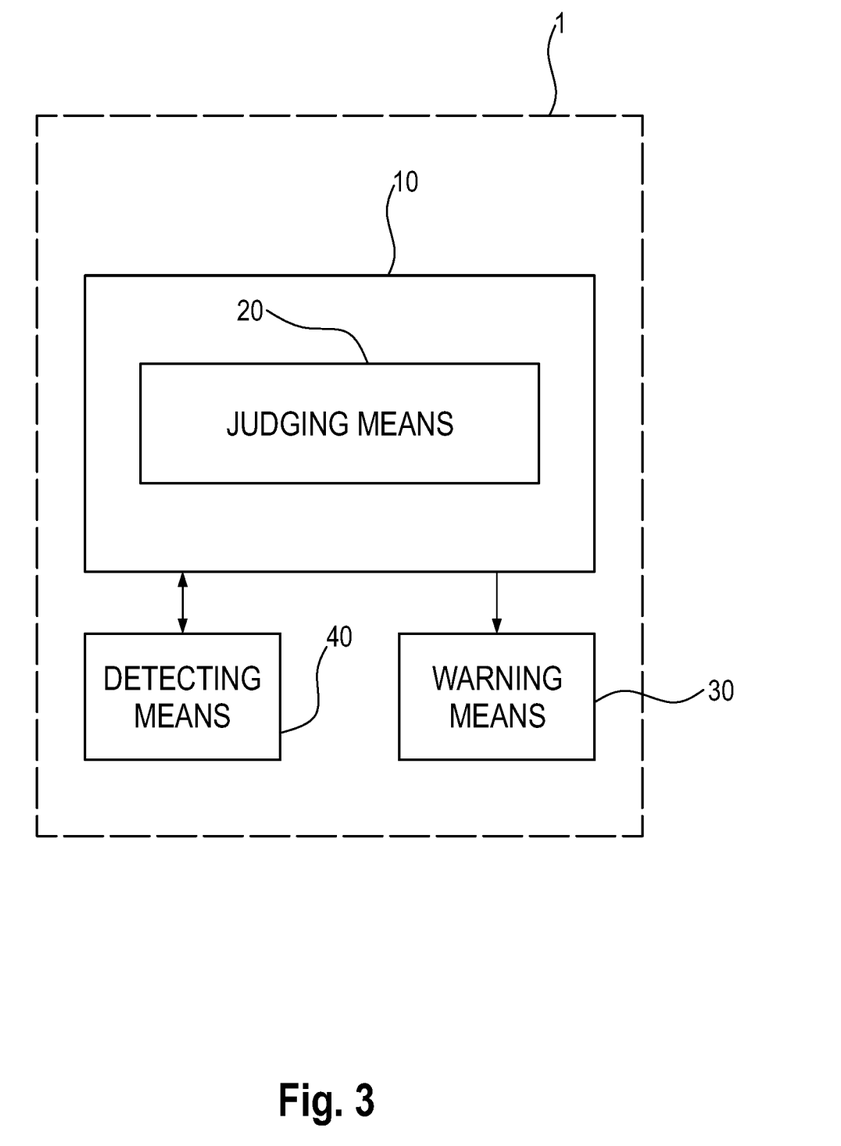
FIG. 3 shows a schematic configuration of the driver assistance system according to the invention of FIG. 1 in more detail.

FIG. 3 shows a schematic configuration of the driver assistance system 1 according to the invention of FIG. 1 in more detail.

As can be gathered from FIG. 3, the driver assistance system 1 provided in the subject vehicle 50 comprises a vehicle object detection system 10 according to the invention, detecting means 40 and warning means 30.

The detecting means 40 is configured to detect a target object 60 like another target vehicle in a detection area DA located behind and lateral of the subject vehicle and will be described in more concrete terms below.

In this first embodiment, the detecting means 40 comprises at least two sensors 401, 402 which are radar sensors, in particular two short range radar sensors configured to detect a target object 60 in the detection area DA.

In more concrete terms, the radar sensors 401, 402 may be part of a conventional (rear-)-cross-traffic alert system, for example, and are—in this specific first embodiment—short range radar sensors 401, 402 which are capable of detecting at least a relative position of the target object 60 (target vehicle) and other objects with respect to the subject vehicle 50, a relative speed/velocity of the target object 60 with respect to the subject vehicle 50, respectively, in the longitudinal direction of the subject vehicle 50 (y-direction of the vehicle in FIG. 1) and the transverse direction of the vehicle (x-direction of the vehicle in FIG. 1), and a reflection strength of the target object 60 which will be described in more concrete terms below.

Accordingly, as can be gathered from FIG. 1, the two short range radar sensors 401, 402 are each configured to detect a target object 60 in the detection area DA, wherein the one sensor 402 is located at a left rear edge/region of the vehicle 50 and the other sensor 401 is located at a right rear edge/region of the vehicle 50. Thus, each sensor 401, 402 monitors/detects, due to its field of view (FoV), a different detectable area DA included in a respective field of view of the respective sensor 401, 402 on both sides of the subject vehicle 50.

The warning means 30 is configured to warning a driver of the subject vehicle 50 that a target object 60 is present in the detection area DA. For example, the warning means 30 may be a conventional visual or acoustic indicator (display or speaker) capable of notifying the driver of the subject vehicle 50 that the target object 60 is present in the detection area DA. In this first embodiment, the warning means 30 warns the driver of the subject vehicle 50 that a target object 60 is present in the detection area DA only if judging means 20 of the vehicle object detection system 10, explained below, generated a judgement indicating that the target object 60 is an alert object.

The vehicle object detection system 10 is for detecting or processing of detection of the target object 60 in the detection area DA located behind and lateral of the subject vehicle 50 and comprises the judging means 20 as mentioned above. The vehicle object detection system 10 may, for example, be implemented by a processor or computer, which has stored several programs for carrying out the function(s) of the judging means 20 and also conventional functions.

The judging means 20 is configured to judge or generate a judgement on whether a target object 60 which has been detected in the detection area DA is an alert object or is not an alert object, and for outputting the judgement to the warning means 30. In turn, the warning means 30 is configured to output a warning to a driver of the subject vehicle 50 that a target object 60 is present in the detection area DA only if the judging means generated the judgment indicating that the target object 60 is an alert object.

At first, the judging means 20 is configured to, if the subject vehicle 50 moves backward, whether a candidate object presently detected in the detection area DA is a candidate for being considered as a target object 60, which is then used for the further judgment on whether the target object 60 is an alert object or not an alert object. Accordingly, the judging means 20 evaluates primary conditions which are that the candidate object detected in the detection area DA is approaching the subject vehicle 50, while the subject vehicle 50 is moving backward, and that an estimated time of collision between the subject vehicle 50 and the candidate object detected in the detection area DA is less then specified time.

In this first embodiment, if the primary conditions are fulfilled, the judging means 20 generates the judgement, if the subject vehicle 50 is detected to move backward, on whether the target object 60 detected in the detection area DA is an alert object or not an alert object. This judgement is based on the evaluation of whether all specific secondary first to fourth conditions are satisfied.

Thus, according to this first embodiment, the judging means 20 generates, if all secondary conditions described below are determined to be satisfied, the judgement indicating that the target object 60 is not an alert object. In the other case, if only one of the secondary conditions is determined to be not satisfied, the judging means 20 generates the judgement that the target object 60 is an alert object which triggers the output of a warning by the warning means 30.

The judgement of the secondary conditions will now be described in more detail:

The judging means 20 is configured to determine a first condition to be satisfied or not based on a detected parameter being a reflection strength of the target object 60 detected in the detection area DA, indicating how detectable the target object 60 is by its reflection amount of energy. In this case, the parameter of the reflection strength is a radar cross-section (RCS) or a radar signature which is well-known in the prior art.

In more concrete terms, the judging means 20 is configured to determine the first condition of the reflection strength to be satisfied if the detected parameter of the reflection strength is less than the specified value.

Furthermore, the judging means 20 is configured to determine a second condition to be satisfied if a detected position of the target object 60 with respect to the subject vehicle 50 is within a specified area SA with respect to the subject vehicle 50. Said specified area SA is an area behind and lateral of the subject vehicle 50 and being included in the detection area DA, as can be gathered from FIG. 1.

As can be further seen in FIG. 1, the specified area SA is defined as an area beginning at a radial distance from the subject vehicle 50, preferably at 9 m from the subject vehicle

50, and ending at a radial distance from the subject vehicle 50, preferably at 42 m. Additionally, the specified area SA is defined as an area which is larger than a specified lateral distance to the subject vehicle 50, preferably larger than 5 m in lateral direction from the subject vehicle 50 (i.e. in the x-direction), as can further be gathered from FIG. 1.

Moreover, the judging means 20 is configured to determine a third condition to be satisfied if—in this case—a plurality of detected positions of one or more other objects 70 other than the target object 60 is detected to be located between the target object 60 being detected in the specified area SA and the subject vehicle 50, wherein a prerequisite is that the plurality of other objects 70 is a plurality of stationary objects which do not move, i.e. the absolute velocity is zero.

Additionally, as a further prerequisite, the stationary objects 70 are detected in a specific angle region AR, as can be seen in FIG. 1, wherein an angle of the specific angle region AR is defined by a position of a right rear sensor 402 of the subject vehicle 50 as vertex, with the target object 60 being located on the angle bisector as shown in FIG. 1. It is quite the same for the other sensor 401 on the left rear side of the vehicle, for which reason a respective description is omitted.

Furthermore, the judging means 20 is configured to determine a fourth condition to be satisfied if a time period during which the target object 60 is detected, is smaller than a specified period of time.

As mentioned above, in this first embodiment, if all first to fourth (secondary) conditions are fulfilled/satisfied, the judging means 20 generates the judgement indicating that the target object 60 is not an alert object. In the other case, if only one of the secondary first to fourth conditions is determined to be not satisfied, the judging means 20 generates the judgement indicating that the target object 60 is an alert object which triggers the output of a warning by the warning means 30.

Thus, if all first to fourth (secondary) conditions are fulfilled/satisfied, the judging means 20 outputs the judgement to the warning means 30 which result of judgement indicates to the warning means 30 not to output a warning even if a target object 60 like a mirror-like object which is actually not existent has been detected, as the judging means 20 generated the judgement indicating that the target object 60 is not an alert object.

Figure 2:
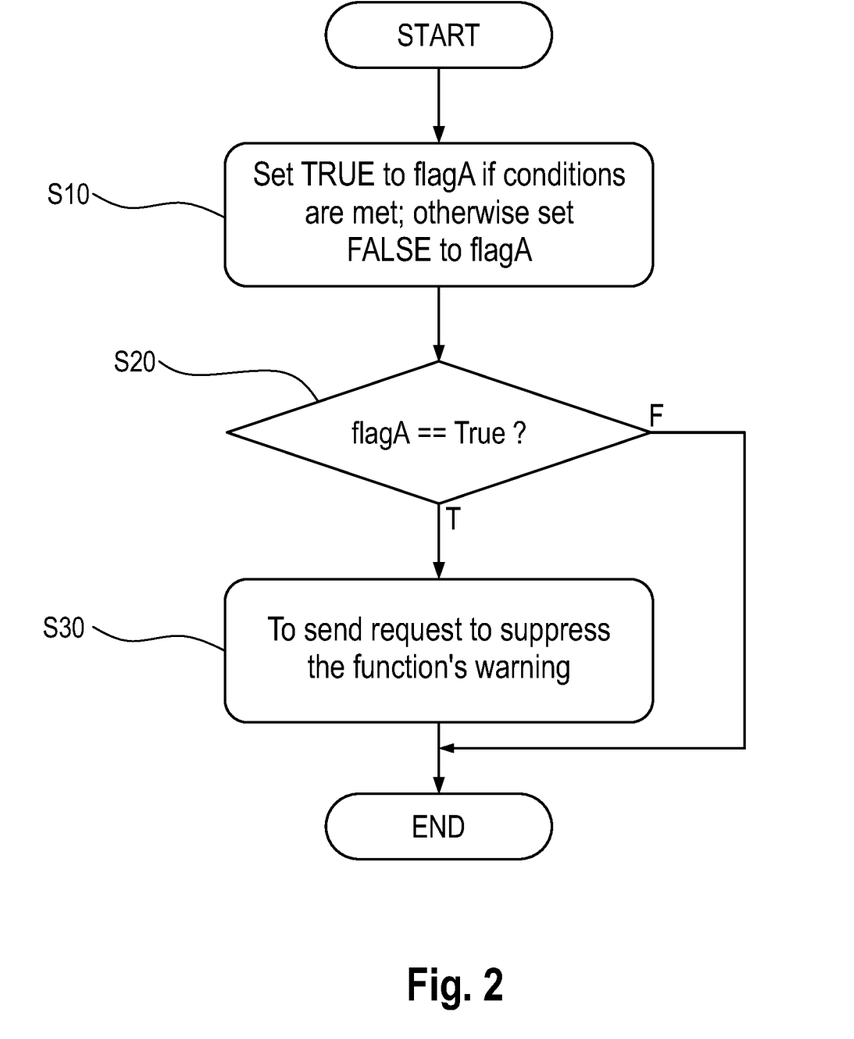
FIG. 2 shows a flowchart of a judging process carried out by the driver assistance system according to the invention of FIG. 1.

FIG. 2 shows a flowchart of a judging process carried out by the driver assistance system 1 according to the invention of FIG. 1. In more detail, the judging process as shown in FIG. 2 is carried out by the judging means 20.

When moving to step S10 of FIG. 1, a candidate object has already been detected in the detection area DA by the detecting means 40, and the judging means 20 generated the judgement, if the subject vehicle 50 moves backward, on whether the candidate object detected in the detection area DA is a candidate for being taken into consideration as a target object 60 used for the judgment whether the target object 60 is an alert object or not an alert object by evaluating the primary conditions. These primary conditions are that the object detected in the detection area DA is approaching the subject vehicle 50, while the subject vehicle 50 is moving backward, and that an estimated time of collision between the subject vehicle 50 and the object detected in the detection area DA is less then specified time.

If these primary conditions are satisfied, the detected object is considered as a target object 60. Then, as can be seen in FIG. 2, in step 10, a data structure in the form of a flag "flagA" (alarm flag for triggering or preventing/suppressing an alarm/or warning process of the warning means 30) is either set to "True" or "False" dependent on the result of the judgement of the judgement means 20.

In more detail, the "flagA" is set TRUE to if the judging means 20 generated the judgement indicating that the target object 60 is not an alert object when the first to fourth conditions as mentioned above are satisfied. In the other case, i.e. the judging means 20 generated the judgement indicating that the target object 60 is an alert object, the "flagA" is set to FALSE. Next, the procedure moves to step S20 in which it is checked whether the "flagA" is set to TRUE. If it is set to TRUE, the procedure moves to step S30, otherwise step S30 is skipped and the procedure is ended and a warning will be output by the warning means 30 if the primary conditions are fulfilled.

In step S30, a request to suppress a warning/alarm is sent to the warning means 30, according to which it is indicated that the target object 60 is not an alert object for the time being so that no warning/alarm is output by the warning means 30 at least until next judgement.

In other words, the judging means 20 outputs the judgement to the warning means 30 which judgement indicates to the warning means 30 to suppress a warning even if a target object 60 has been detected, as the judging means 20 generated the judgement indicating that the target object is not an alert object.

Next, one example of operation of the driver assistance system 1 provided with the vehicle object detection system 10 is described on the basis of FIG. 1.

As can be seen in FIG. 1), the subject vehicle 50 is driving backward and it is assumed that the candidate object fulfills the primary conditions so that the candidate object is considered as a target object 60 detected by the right rear radar sensor 402.

Then, the judging means 20 evaluates whether the first to fourth secondary conditions are satisfied.

In this case, all first to fourth secondary conditions are satisfied. That is, in more concrete terms, a reflection strength of the target object is less than a specified value (first condition), a position of the target object 60 is within the specified area as defined above (second condition), there are multiple stationary objects 70 in the specific angle region AR (third condition) and the time period during which the target object 60 is detected, is smaller than the specified period of time (fourth condition).

Accordingly, as all first to fourth conditions are fulfilled in this case, the judging means generates the judgement indicating that the target object 60 is not an alert object so that the warning means 30 will not output a warning even if a target object 60 has been detected in the detection area DA. This is because the target object 60 detected and fulfilling all first to fourth conditions is considered to be not existent but rather originating from a false detection like a reflection, for example, a multi-reflection cause by one of the stationary objects, etc.

Second Embodiment

In the following, a second embodiment of the invention will be described, wherein in the description of the second embodiment, only the differences with respect to the first embodiment will be explained in more detail. Otherwise, i.e. with the exception of the differences described below, the driver assistance system 1 and the vehicle object detection system 10 according to the second embodiment fully correspond to the driver assistance system 1 and the vehicle object detection system 10 according to the first embodiment.

The drawings, i.e. FIGS. 1 to 3, relating to the first embodiment also apply in full to the second embodiment. Corresponding components of the second embodiment corresponding to those of the first embodiment are designated with the same reference signs as used in connection with the first embodiment.

The second embodiment differs from the first embodiment in that, for the sake of reducing the processing load on the vehicle object detection system 10 or the judging means 20, it is not necessary that all first to fourth (secondary) conditions have to be fulfilled/satisfied so that the judging means 20 generates the judgement indicating that the target object 60 is not an alert object.

In the second embodiment, the judging means 20 generates the judgement indicating that the target object 60 is not an alert object if merely the aforementioned third and fourth conditions are satisfied. Accordingly, the first and second conditions are not used/judged in this second embodiment.

In the other case, if only one of the third and fourth conditions is determined to be not satisfied, the judging means 20 generates the judgement indicating that the target object 60 is an alert object which triggers the output of a warning by the warning means 30.

Further Modifications

According to any of the above-mentioned embodiments, the judging means 20 may include a judging processor. The judging processor may carry out the functions of the judging means 20.

The features of the invention disclosed in the foregoing description, in the drawings as well as in the claims may be essential for the realization of the invention both individually and in any combination.

The invention claimed is:

1. A vehicle object detection system (10) for detecting a target object (60) in a detection area (DA) located behind and/or lateral of a subject vehicle (50), the vehicle object detection system (10) comprising:
   judging means (20) configured to generate a judgement on whether a target object (60) which has been detected in the detection area (DA) is an alert object, and to output the judgement to warning means (30) which is configured to output a warning to a driver of the subject vehicle (50) based on the judgement indicating that the target object (60) is an alert object, wherein the judging means (20) is configured to generate the judgement based on
   one or more positions of one or more other objects (70) other than the target object (60) being detected to be located between the target object (60) and the subject vehicle (50), and
   a time period during which the target object (60) is detected, being smaller than a specified period of time.

2. The vehicle object detection system (10) according to claim 1, wherein the judging means (20) is configured to generate the judgement further based on
   a detected reflection strength of the detected target object, the reflection strength being indicative of an amount of energy that the detected target object reflects off and being less than a specified value.

3. The vehicle object detection system (10) according to claim 2, wherein the reflection strength is a radar cross-section (RCS) or a radar signature.

4. The vehicle object detection system (10) according to claim 1, wherein the judging means (20) is configured to generate the judgement further based on
   a detected position of the target object (60) with respect to the subject vehicle (50) being within a specified area (SA) with respect to the subject vehicle (50), being an area behind and/or lateral of the subject vehicle (50) and being included in the detection area (DA).

5. The vehicle object detection system (10) according to claim 4, wherein the specified area (SA) is at least one of an area beginning at a radial distance from the subject vehicle (50) and ending at a radial distance from the subject vehicle (50) or an area which is larger than a specified lateral distance to the subject vehicle (50).

6. The vehicle object detection system (10) according to claim 4, wherein the one or more positions of the one or more other objects (70) are detected to be in an area of the detection area (DA) being located between the subject vehicle (50) and the specified area (SA).

7. The vehicle object detection system (10) according to claim 1, wherein the one or more other objects (70) are detected to be one or more stationary objects and/or are detected to be located in a specific angle region (AR), an angle of the specific angle region (AR) being defined by a position of a sensor (401, 402) of the subject vehicle (50) as vertex, with the target object (60) being located on the angle bisector.

8. The vehicle object detection system according to claim 1, wherein the judging means (20) is configured to generate the judgement on whether the target object (60) which has been detected in the detection area (DA) is an alert object, in response to the subject vehicle being detected to move backward.

9. The vehicle object detection system (10) according to claim 1, wherein the judging means (20) is configured to, based on the subject vehicle (50) moving backward, generate the judgement indicating that the target object (60) is not an alert object based on at least the following conditions being satisfied, the conditions being
   one or more positions of one or more other objects (70) other than the target object (60) being detected to be located between the target object (60) and the subject vehicle (50),
   a time period during which the target object (60) is detected, being smaller than a specified period of time,
   a detected reflection strength of the detected target object being less than a specified value, the reflection strength being indicative of an amount of energy that the detected target object reflects off, and
   a detected position of the target object (60) with respect to the subject vehicle (50) being within a specified area (SA) with respect to the subject vehicle (50), being an area behind and/or lateral of the subject vehicle (50) and being included in the detection area (DA).

10. The vehicle object detection system (10) according to claim 1, wherein the judging means (20) is configured to, based on the subject vehicle (50) moving backward, judge whether a candidate object detected in the detection area (DA) is a candidate for being considered as target object (60) used for the judgment of whether the target object (60) is an alert object by evaluating the following primary conditions:
   the object detected in the detection area (DA) is approaching the subject vehicle, while the subject vehicle is moving backward, and/or
   an estimated time of collision between the subject vehicle and the object detected in the detection area (DA) is less than a specified time.

11. The vehicle object detection system (10) according to claim 1, wherein the judging means (20) is configured to output the judgement to the warning means (30) which judgement indicates to the warning means (30) not to output a warning even if a target object has been detected, based on the judging means (20) generating the judgement indicating that the target object (60) is not an alert object.

12. A driver assistance system (1) for a subject vehicle (50), comprising:
    detecting means (40) configured to detect a target object (60) in a detection area (DA) located behind and/or lateral of the subject vehicle (50),
    a vehicle object detection system (10) according to claim 1, and
    warning means (30) configured to warn a driver of the subject vehicle that a target object (60) is present in the detection area (DA) based on the judging means (20) of the vehicle object detection system (10) generating the judgement indicating that the target object (60) is an alert object.

13. A computer-implemented method for detecting a target object (60) in a detection area (DA) located behind and/or lateral of a subject vehicle (50), particularly for controlling a vehicle object detection system (10) according to claim 1, wherein the method comprises the following steps:
    generating a judgement on whether a target object (60) which has been detected in the detection area (DA) is an alert object, and outputting the judgement to warning means (30) which is configured to output a warning to a driver of the subject vehicle (50) based on the judgement indicating that the target object (60) is an alert object,
    wherein, in the step of judging, generating the judgement is based on
    one or more positions of one or more other objects (70) other than the target object (60) being detected to be located between the target object (60) and the subject vehicle (50), and
    a time period during which the target object (60) is detected, being smaller than a specified period of time.

14. A non-transitory computer-readable medium having stored thereon a computer program comprising instructions which, when the program is executed by a computer, cause the computer to carry out the computer-implemented method of claim 13.

15. The vehicle object detection system (10) according to claim 1, wherein the vehicle object detection system (10) comprises a rear-cross traffic detection system.

16. The vehicle object detection system (10) according to claim 5, wherein the specified area (SA) is an area beginning at a radial distance of 9 from the subject vehicle (50) and ending at a radial distance of 42 m from the subject vehicle (50).

17. The vehicle object detection system (10) according to claim 5, wherein the specified area (SA) is an area larger than 5 m in lateral distance from the subject vehicle (50).

* * * * *